US012355366B2

(12) United States Patent
Mishra et al.

(10) Patent No.: US 12,355,366 B2
(45) Date of Patent: Jul. 8, 2025

(54) RADIALLY SYMMETRICAL PLANAR BUSBARS FOR MULTI-PHASE INVERTERS

(71) Applicants: Cummins Inc., Columbus, IN (US); Sanchit Mishra, Minneapolis, MN (US)

(72) Inventors: Sanchit Mishra, Minneapolis, MN (US); Akm Arafat, Blaine, MN (US); Michael Hays, Columbus, IN (US); Dakshina Subbarao Murthy-Bellur, Plymouth, MN (US); Minyu Cai, Maplewood, MN (US)

(73) Assignee: Cummins Inc., Columbus, IN (US)

( * ) Notice: Subject to any disclaimer, the term of this patent is extended or adjusted under 35 U.S.C. 154(b) by 223 days.

(21) Appl. No.: 18/038,348

(22) PCT Filed: Nov. 10, 2021

(86) PCT No.: PCT/US2021/058782
§ 371 (c)(1),
(2) Date: May 23, 2023

(87) PCT Pub. No.: WO2022/115239
PCT Pub. Date: Jun. 2, 2022

(65) Prior Publication Data
US 2023/0421075 A1 Dec. 28, 2023

Related U.S. Application Data

(60) Provisional application No. 63/117,632, filed on Nov. 24, 2020.

(51) Int. Cl.
*H02M 7/5387* (2007.01)
*H02P 27/06* (2006.01)
*H02M 1/44* (2007.01)

(52) U.S. Cl.
CPC .......... *H02M 7/5387* (2013.01); *H02P 27/06* (2013.01); *H02M 1/44* (2013.01)

(58) Field of Classification Search
CPC ........ H02M 7/5387; H02M 7/00; H02M 1/44; H02P 27/06
See application file for complete search history.

(56) References Cited

U.S. PATENT DOCUMENTS

| 4,292,665 A | 9/1981 | Hersom et al. |
| 4,404,423 A | 9/1983 | Sakakibara et al. |

(Continued)

FOREIGN PATENT DOCUMENTS

WO    2013005385 A1    1/2013

OTHER PUBLICATIONS

International Search Report and Written Opinion for International Patent Application No. PCT/US2021/058782, filed Nov. 10, 2021, mailed Feb. 4, 2022.

*Primary Examiner* — Adolf D Berhane
(74) *Attorney, Agent, or Firm* — Faegre Drinker Biddle & Reath LLP (57) ABSTRACT

Inverter apparatuses and systems with a DC energy source are disclosed, in which a planar and radially symmetrical positive DC busbar is coupled with a positive terminal of the DC energy source and a planar and radially symmetrical negative DC busbar is coupled with a negative terminal of the DC energy source. The inverter has a plurality of switches such that the plurality of switches are positioned radially symmetrically with respect to a center of the DC busbars. Each switch is coupled with either the positive DC busbar or the negative DC busbar on a first end and one of a plurality of AC busbars on a second end. A single toroidal filtering core is located at the center of the DC busbars and is coupled with the plurality of AC busbars.

18 Claims, 9 Drawing Sheets

(56) References Cited

U.S. PATENT DOCUMENTS

| | | |
|---|---|---|
| 6,433,271 B1 | 8/2002 | Arnborg |
| 2014/0368145 A1 | 12/2014 | Miyachi et al. |
| 2017/0207631 A1 | 7/2017 | Helling et al. |
| 2019/0334456 A1 | 10/2019 | Kashima |
| 2019/0366951 A1 | 12/2019 | Young et al. |
| 2024/0128844 A1* | 4/2024 | Islam .................. H02K 3/28 |

* cited by examiner

RADIALLY SYMMETRICAL PLANAR BUSBARS FOR MULTI-PHASE INVERTERS

CROSS-REFERENCE TO RELATED APPLICATIONS

The present application claims priority to and is a U.S. national stage application of International Patent Application No. PCT/US2021/058782, filed Nov. 10, 2021, which claims priority to U.S. Provisional Application Ser. No. 63/117,632, entitled "RADIALLY SYMMETRICAL PLANAR BUSBARS FOR MULTI-PHASE INVERTERS," filed on Nov. 24, 2020, the entire disclosures of which are expressly incorporated herein by reference.

FIELD OF THE DISCLOSURE

The present disclosure relates generally to busbars, especially to busbars implemented in inverters.

BACKGROUND OF THE DISCLOSURE

Multi-phase electric machines have been used extensively in electrically powered systems due to the relatively low cost, reliability, and robustness as compared to DC drive systems. An inverter is used to operate the multi-phase machine such that the electrical energy provided by a direct-current (DC) source is converted to alternating-current (AC) energy to be used to operate the multi-phase machine. Typically, the DC voltage source is connected to the inverter through a common rail or busbar which is a metallic strip or bar for local high current power distribution. Busbars are typically produced as flat strips, solid bars, or rods. However, in some situations, the inverters using such busbars may experience uneven temperature increase in different sections of the inverter as the multi-phase machine is operated, causing some components to fail earlier than others. Therefore, further technological developments are desirable in this area.

SUMMARY OF THE DISCLOSURE

Various embodiments of the present disclosure relate to inverter apparatuses and systems with a DC energy source such that a planar and radially symmetrical positive DC busbar is coupled with a positive terminal of the DC energy source and a planar and radially symmetrical negative DC busbar is coupled with a negative terminal of the DC energy source. The inverter has a plurality of switches such that the plurality of switches are positioned radially symmetrically with respect to a center of the DC busbars. Each switch is coupled with either the positive DC busbar or the negative DC busbar on a first end and one of a plurality of AC busbars on a second end. A single toroidal filtering core is located at the center of the DC busbars and is coupled with the plurality of AC busbars.

In some embodiments, surfaces of the positive DC busbar and the negative DC busbar are coated with an insulating coating material. In some examples, one of the DC busbars is mounted on the other of the DC busbars. In some examples, the one of the DC busbars is electrically coupled with the plurality of switches through a plurality of openings formed in the other DC busbar.

In some examples, the apparatus has a planar base on which the DC busbars are installed. In some examples, the inverter is coupled with a load such that a longitudinal axis of the load is substantially perpendicular to a plane defined by at least one of the DC busbars. The load may include a stator, and the inverter is installed on a periphery of the stator.

In some examples, each of the DC busbars comprises a circular configuration, or alternatively a regular hexagonal configuration. The apparatus in some examples includes a printed circuit board positioned concentrically with respect to the DC busbars. In some examples, the inverter is a 3-phase inverter comprising 6 switches, a 6-phase inverter comprising 12 switches, or a 9-phase inverter comprising 18 switches. A secondary filtering core may be coupled with the DC busbars in some examples. In some examples, each pair of the plurality of switches is contained in one of a plurality of switch modules. The switch modules are positioned radially symmetrically along the positive DC busbar and the negative DC busbar such that each of the switch modules is electrically coupled with the positive DC busbar, the negative DC busbar, and one of the plurality of AC busbars.

Also disclosed herein are electric machine systems in which there is a DC energy source, a planar and radially symmetrical positive DC busbar coupled with a positive terminal of the DC energy source, and a planar and radially symmetrical negative DC busbar coupled with a negative terminal of the DC energy source. The system also includes an inverter with a plurality of switches such that the plurality of switches are positioned radially symmetrically with respect to a center of the DC busbars, and each switch is coupled with either the positive DC busbar or the negative DC busbar on a first end and one of a plurality of AC busbars on a second end. A single toroidal filtering core is located at the center of the DC busbars and configured to couple with the plurality of AC busbars. The system also includes an electric machine that is electrically coupled with the plurality of AC busbars such that a longitudinal axis of the electric machine is substantially perpendicular to a plane defined by at least one of the DC busbars.

In some embodiments of the system, surfaces of the positive DC busbar and the negative DC busbar are coated with an insulating coating material. In some examples, one of the DC busbars is mounted on the other of the DC busbars. In some examples, the one of the DC busbars is electrically coupled with the plurality of switches through a plurality of openings formed in the other DC busbar. In some examples, each of the DC busbars may have a circular configuration or a regular hexagonal configuration.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

Figure 1:
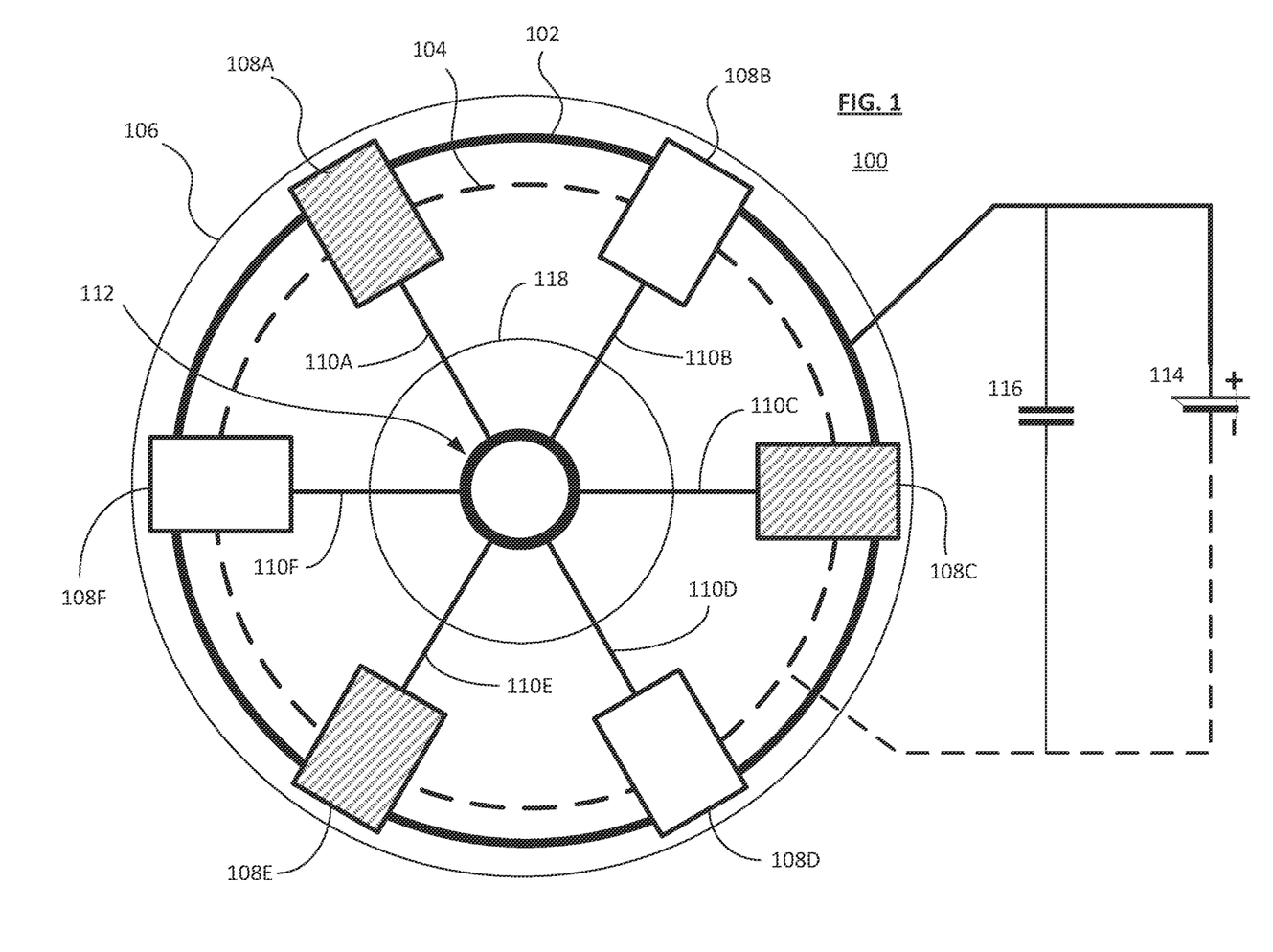
FIG. 1 shows an inverter system with circular DC busbars according to the embodiments disclosed herein.

FIG. 1 illustrates an example of an inverter apparatus 100 according to embodiments disclosed herein, which is used to operate a multi-phase electric machine. The inverter apparatus 100 includes a circular positive direct-current (DC) busbar 102 (shown in bold line) and a circular negative DC busbar 104 (shown in broken line). In some examples, surfaces of the busbars 102 and 104 are covered with an insulating coating material so as to prevent short circuiting when the two busbars come into contact with each other. In some examples, the busbars 102 and 104 are installed on a base plate 106. In some examples, the base plate 106 may be made of an insulating material or have an insulating coating material on its surface such that the base plate 106 insulates the two busbars 102 and 104 from each other to avoid short circuiting. In some examples, the busbars 102 and 104 are located on the same side (common side) of the plate 106, whereas in other examples, the busbars 102 and 104 are located on different or opposing sides of the plate 106. The busbars can be composed of copper, brass, or aluminum, among other suitable conductive materials.

The inverter is made of a plurality of switches, which in the illustrated example includes six (6) switches 108A through 108F to form a 3-phase inverter. The switches are positioned radially symmetrically with respect to a center of the busbars 102 and 104, and each of the switches 108A through 108F is electrically coupled with either the positive busbar 102 or the negative busbar 104. In the example shown, the switches 108A, 108C, and 108E are electrically coupled with the positive busbar 102 and the switches 108B, 108D, and 108F are electrically coupled with the negative busbar 104. Each switch 108 is coupled with the respective busbar 102 or 104 on one end, while the other end is coupled with an alternating-current (AC) busbar 110. The switches may be IGBTs, FETs (including MOSFET type), gated thyristors, SCRs, or such other suitable gates/switching devices as would occur to those skilled in the art.

There are as many AC busbars 110 as the number of switches 108 in the apparatus 100. In the example shown, there are six (6) AC busbars 110A through 110F, and all the AC busbars 110A through 110F are coupled with a toroidal core 112 placed at the center of the circular DC busbars 102 and 104 such that each AC busbar 110 has approximately equal length. The circular positive DC busbar 102 is concentric with the circular negative DC busbar 104, and in some examples, the diameter of the circular positive DC busbar 102 is greater than, equal to, or less than the circular negative DC busbar 104.

The toroidal core 112 is a piece of magnetic material with high magnetic permeability, such as a ferromagnetic metal, through which the AC busbars 110 are passing to form a passive common-mode filter which resists common-mode current which may create interference and disrupt operation of the apparatus 100.

Figure 1A:
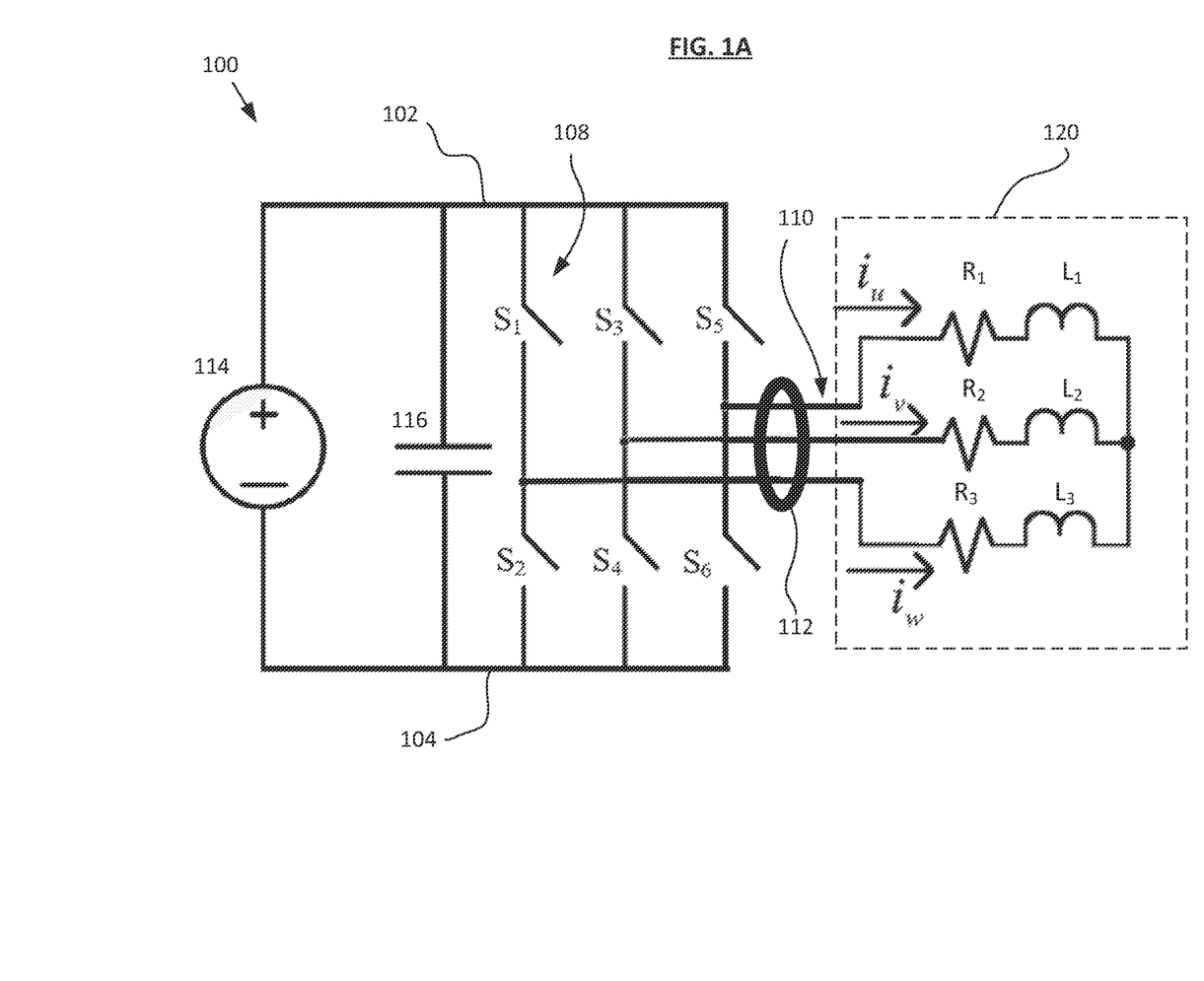
FIG. 1A shows the inverter system of FIG. 1 implemented with a load such as a 3-phase electric machine, according to the embodiments disclosed herein.

The energy for operating the multi-phase machine is provided by a DC voltage source 114, for example a battery. A capacitor 116 is coupled in parallel with the DC voltage source 114 to minimize the effects of voltage variations as the load changes. The capacitor 116 also provides a low-impedance path for ripple currents generated by power switching circuits. A load 120, shown in FIG. 1A, is connected to the AC busbars 110 after the AC busbars 110 pass through the toroidal core 112. In some examples, the space between two neighboring AC busbars 110 can be populated with other printed circuit boards (PCB). In some examples, the base plate 106 has an opening 118 through which the AC busbars 110 can extend to couple with the toroidal core 112. With the use of the opening 118, the toroidal core 112 and the DC busbars 102 and 104 can be positioned on opposing sides of the base plate 106.

FIG. 1A schematically shows the load 120 being connected to the switches 108, which in this example includes six (6) switches $S_1$ through $S_6$ to form a 3-phase inverter, although in other configurations there may be any suitable number of switches to implement other multi-phase inverters as known in the art, such as twelve (12) switches for a 6-phase inverter and eighteen (18) switches for a 9-phase inverter, for example. These examples are non-limiting, and any number of phases may be implemented as suitable. The load 120 may be a multi-phase electric machine. The multi-phase electric machine includes resistors (e.g., $R_1$, $R_2$, and $R_3$) and inductors (e.g., $L_1$, $L_2$, and $L_3$) to receive electric current (e.g., $i_u$, $i_v$, and $i_w$) from the AC busbars 110. The number of resistors and inductors may vary depending on the type of multi-phase machine that is to be implemented. The operation of the multi-phase electric machine is performed by a motor control unit (MCU), not shown, which controls the switches to create AC current to operate the electric machine.

The MCU, or more broadly referred to as a control unit, is a programmable micro-processing device of a solid-state, integrated circuit type that includes one or more processing units and memory units, for example. Control unit can include one or more signal conditioners, modulators, demodulators, Arithmetic Logic Units (ALUs), Central Processing units (CPUs), limiters, oscillators, control clocks, amplifiers, signal conditioners, filters, format converters, communication ports, clamps, delay devices, memory devices, and/or different circuitry or functional components, etc., as would occur to those skilled in the art to perform the desired communications. In one form, control unit includes a computer network interface to facilitate communications using the Controller Area Network (CAN) standard among various system components and/or components not included in the depicted system, as desired.

Figure 1B:
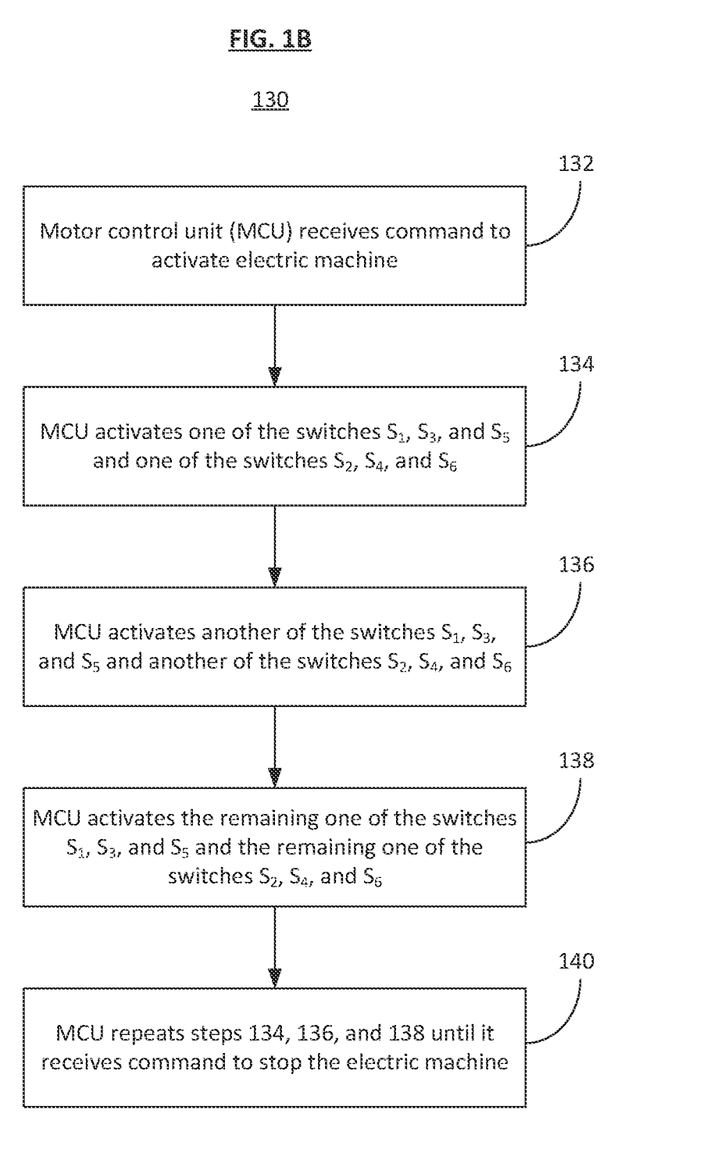
FIG. 1B shows a control flow diagram of controlling and operating the inverter system shown in FIG. 1A.

FIG. 1B illustrates a control flow diagram 130 with which the MCU controls the inverter system 100. In step 132, the MCU receives a command (for example, a command signal or activation signal such as an acceleration pedal being pressed or an "on" switch) to activate the electric machine 120. In step 134, the MCU activates one of the switches $S_1$, $S_3$, and $S_5$ to electrically connect the positive DC busbar 102 with the electric machine 120 as well as one of the switches $S_2$, $S_4$, and $S_6$ to electrically connect the electric machine 120 with the negative DC busbar 104, thereby forming a circuit to allow electric current $i_u$, $i_v$, or $i_w$ to flow therethrough. Next, in step 136, the MCU activates another one of the switches $S_1$, $S_3$, and $S_5$ (which is different from the switch activated in step 134) to electrically connect the positive DC busbar 102 with the electric machine 120 as well as another one of the switches $S_2$, $S_4$, and $S_6$ (which is also different from the switch activated in step 134) to electrically connect the electric machine 120 with the negative DC busbar 104. Thereafter, in step 138, the MCU activates the last remaining one of one of the switches $S_1$, $S_3$, and $S_5$ (which was not activated in steps 134 and 136) to electrically connect the positive DC busbar 102 with the electric machine 120 as well as the last remaining one of the switches $S_2$, $S_4$, and $S_6$ (which was also not activated in steps 134 and 136) to electrically connect the electric machine 120 with the negative DC busbar 104.

The MCU then repeats the steps 134, 136, and 138, shown in step 140, until it receives another command (for example, a stop signal or deactivation signal such as a brake pedal being pressed or an "off" switch) to stop activating the electric machine 120, in which case the switches 108 are controlled to form an open circuit to prevent the electric machine 120 from receiving any electric current. It is to be understood that FIGS. 1A and 1B are shown as such for illustrative purposes only, and thus any number of switches may be implemented so long as the number of switches are suitable to operate the electric machine 120 using the number of phases as operated by the MCU, as previously explained.

Figure 2:
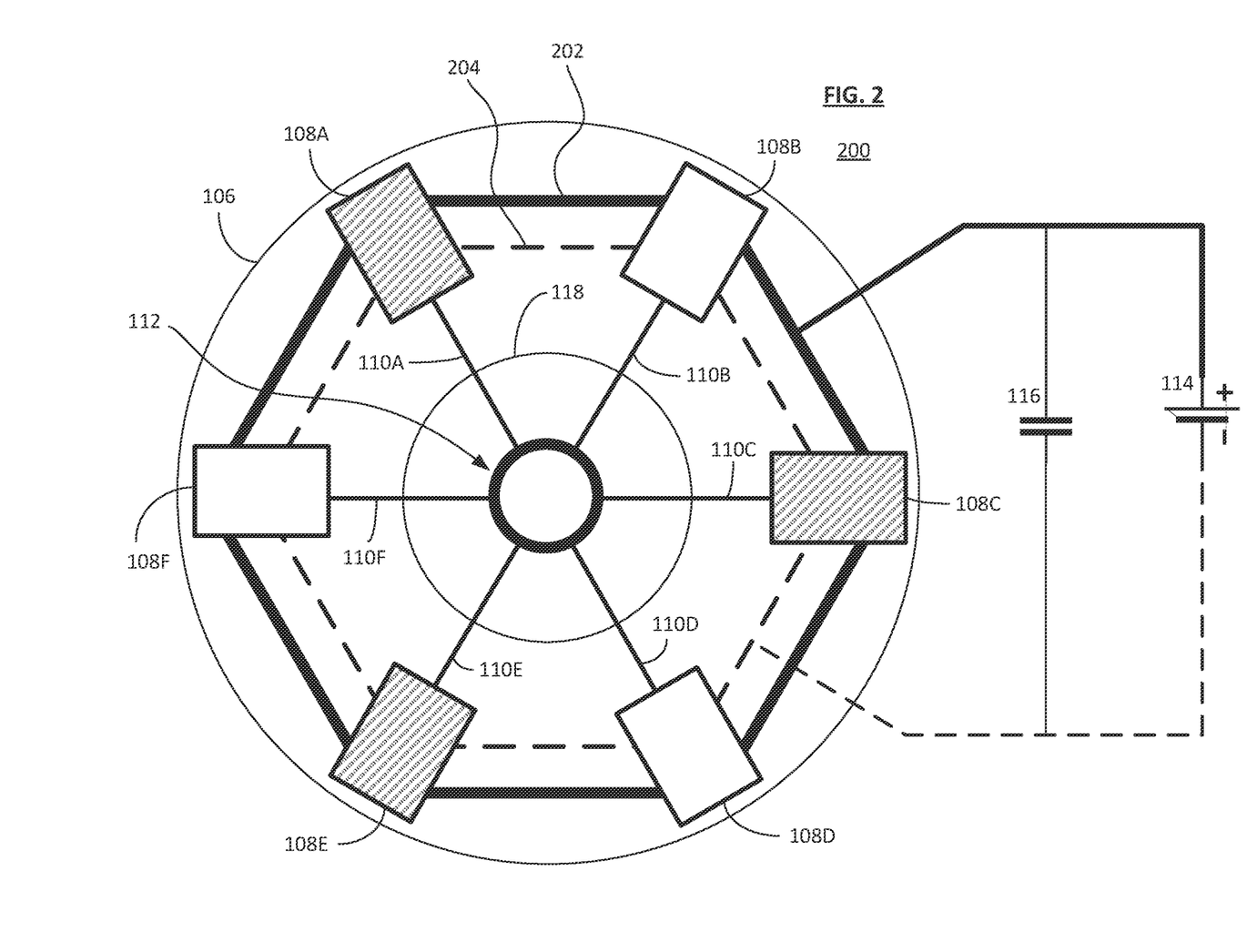
FIG. 2 shows an inverter system with hexagonal DC busbars according to the embodiments disclosed herein.

FIG. 2 illustrates another example of an inverter apparatus 200 according to some of the embodiments disclosed herein, which is also used to operate a multi-phase machine. The inverter apparatus 200 includes a hexagonal positive DC busbar 202 (shown in bold line) and a hexagonal negative DC busbar 204 (shown in broken line). The DC busbars 202 and 204 both have the shape of a regular hexagon such that the DC busbars 202 and 204 are radially symmetrical about the center with respect to the switches 108A through 108F and the AC busbars 110A through 110F. It is to be understood that when a different number of switches are implemented, the shape of the DC busbars 202 and 204 changes according to the number of switches, so long as the DC busbars 202 and 204 maintain the radial symmetry.

Figure 3:
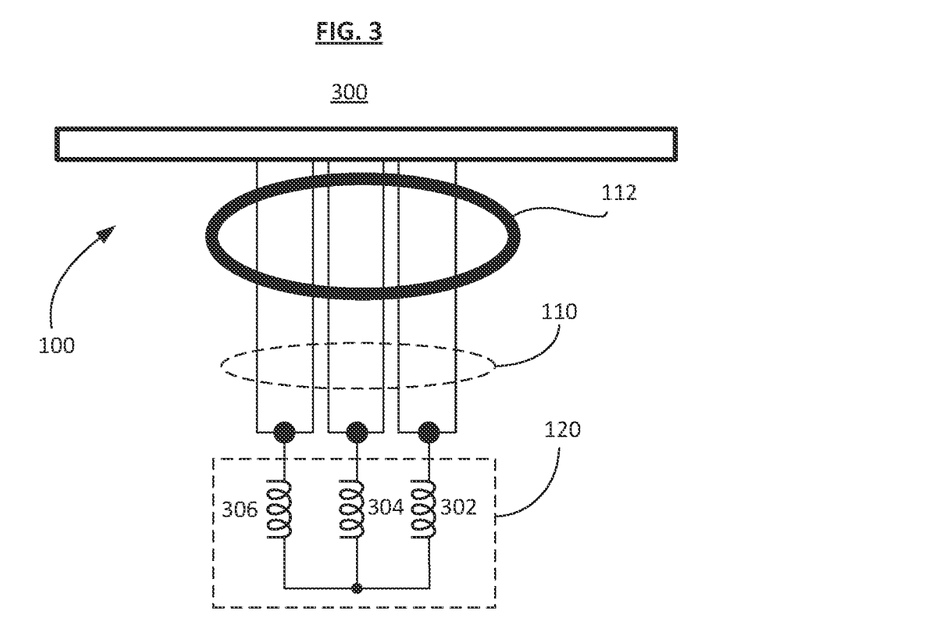
FIG. 3 shows an electric machine system implementing the inverter system and the electric machine according to the embodiments disclosed herein.

FIG. 3 illustrates an example of an electric machine system 300 that is implemented according to embodiments disclosed herein. As previously explained, the AC busbars 110 pass through the toroidal core 112 before connecting with inductors 302, 304, and 306 of the load 120 of the multi-phase electric machine. In this example, the multi-phase electric machine is a 3-phase electric motor. The AC busbars 110, which can include insulated conductive wires, pass through the toroidal core 112 to form a common-mode choke that presents high impedance to the noise signal and to suppress electromagnetic interference and radiofrequency interference from power supply lines. The common mode refers to signals or noises that flow in the same direction in a pair of lines.

In some examples, the load 120 can be placed substantially perpendicularly (for example, between 80° and 90°, between 85° and 90°, or precisely at 90°) to the DC busbars 102 and 104, or to the planar base plate 106. That is, the load 120 has a longitudinal axis that is substantially perpendicular to the plane defined by the planar DC busbars 102 and/or 104 or the planar base plate 106. Alternatively, the AC busbars 110 can extend perpendicularly from the inverter apparatus 100 toward the load 120 after coupling with the toroidal core 112. In the example of an motor, the longitudinal axis may be defined by the motor shaft around which the stator and rotor are positioned. The motor may have a generally cylindrical shape, in which case the center line of the cylindrical shape defines the longitudinal axis.

Figure 4:
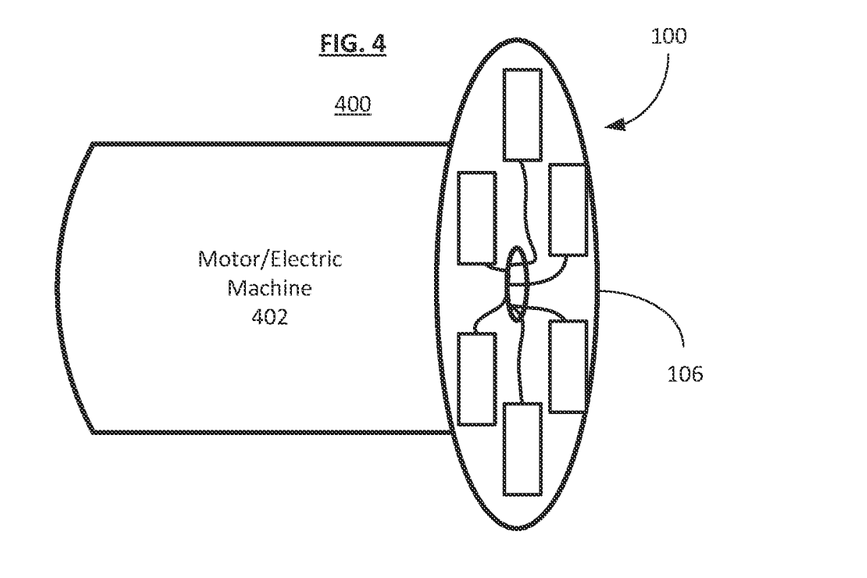
FIG. 4 shows an electric machine system implementing the inverter system and the electric machine according to the embodiments disclosed herein.

FIG. 4 illustrates an example of how the inverter apparatus 100 can be attached or mounted to an electric machine 402 in an electric machine system 400. As previously described, a multi-phase electric machine can assume a substantially cylindrical shape and defining a longitudinal axis that is perpendicular to the DC busbars 102 and 104 or to the base plate 106. In the example shown, the diameter of the base plate 106 or the diameter of the DC busbar 102 or 104 is greater than a diameter of the substantially cylindrical body of the electric machine 402, and the plate 106 is mounted on one end of the body of the electric machine 402. The mounting or attaching may be performed via any suitable mechanical coupling means including but not limited to welding. In some examples, the diameter of the base plate 106 or the diameter of the DC busbar 102 or 104 is substantially equal to the diameter of the substantially cylindrical body of the electric machine 402 or the diameter of a cross section of the stator of the electric machine 402 and can be installed or placed on the periphery of the stator.

Figure 5A:
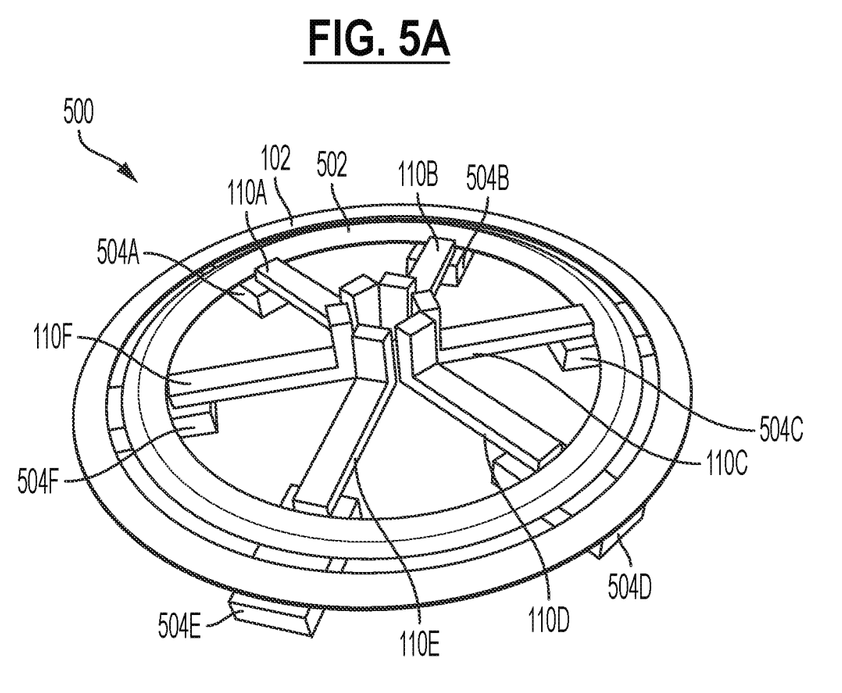
FIG. 5A shows an inverter system with circular DC busbars according to the embodiments disclosed herein, as viewed from above.
Figure 5B:
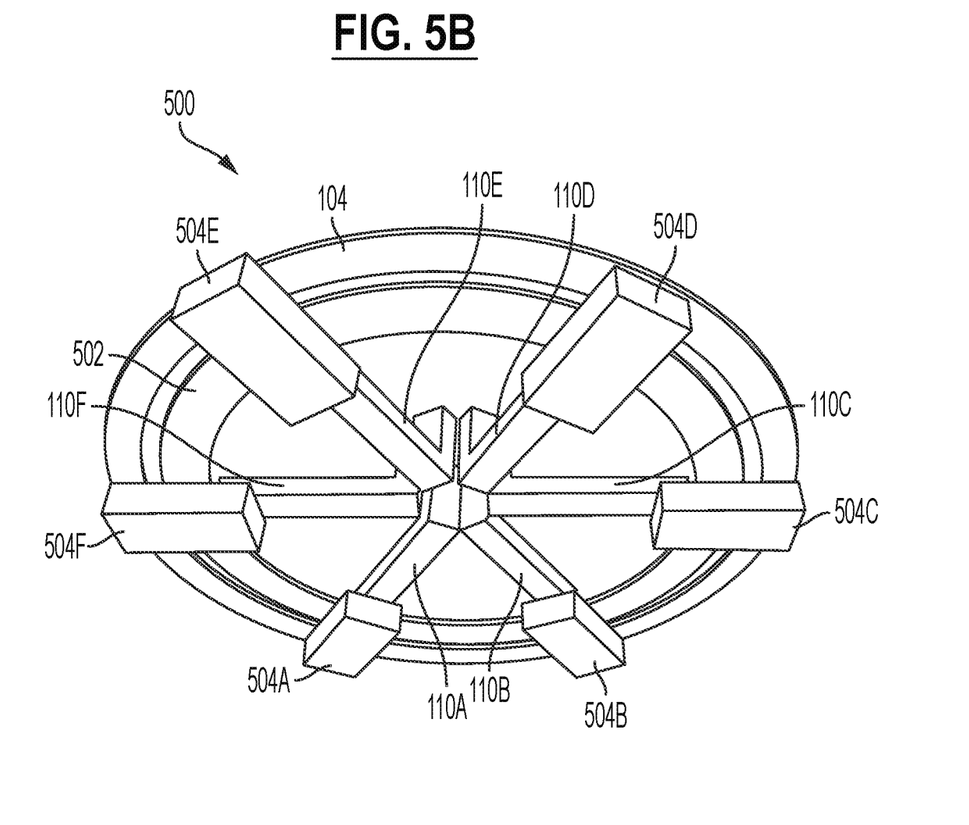
FIG. 5B shows the inverter system with circular DC busbars of FIG. 5A as viewed from below.
Figure 5C:
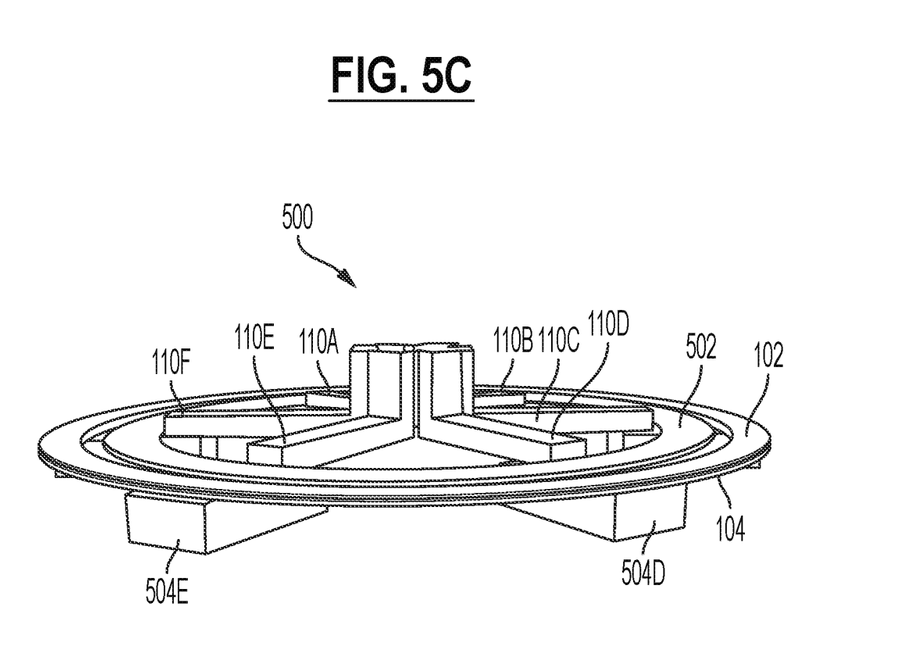
FIG. 5C shows the inverter system with circular DC busbars of FIGS. 5A and 5B as viewed from the side.
Figure 5D:
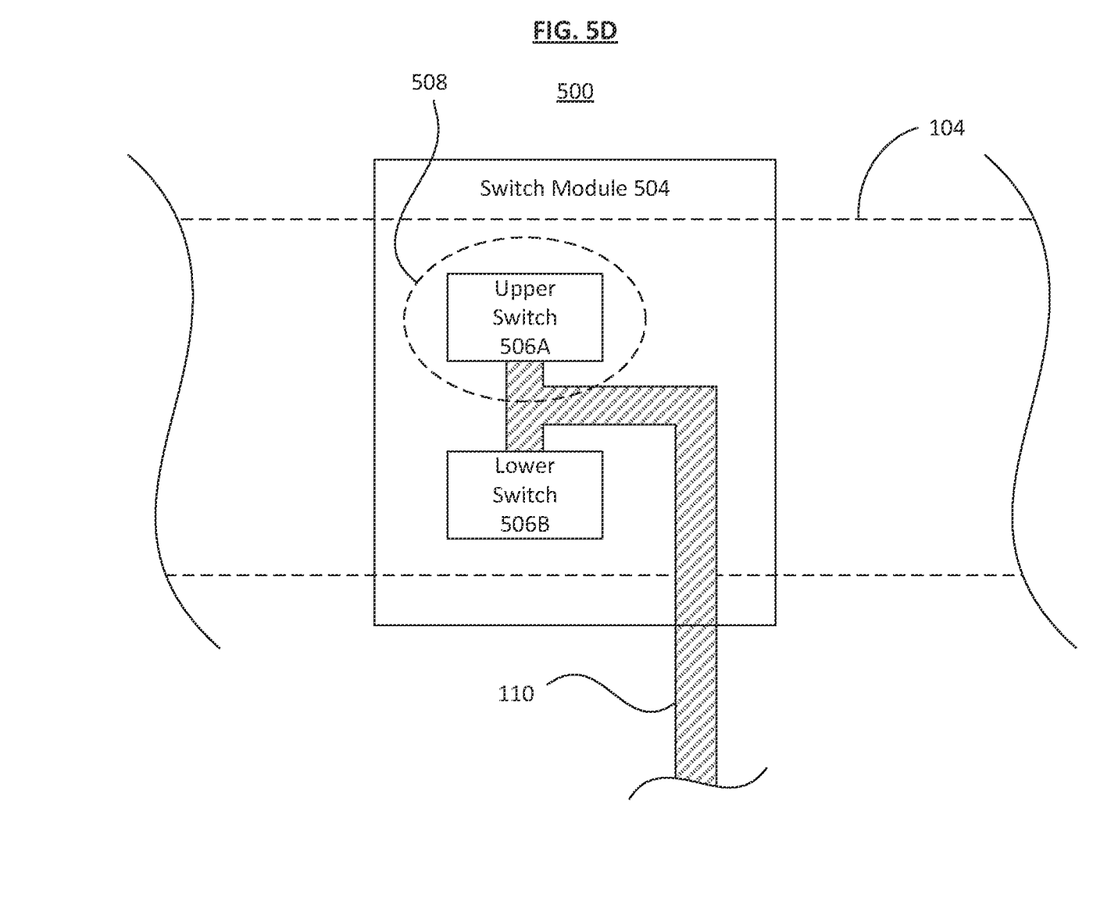
FIG. 5D shows a schematic diagram of a switch module, a negative DC busbar, and an AC busbar of FIGS. 5A through 5C, according to the embodiments disclosed herein.

FIGS. 5A through 5D illustrate an example of an inverter apparatus 500 with a printed circuit board (PCB) 502 implemented thereon as well as the circular DC busbars 102 and 104 stacked on top of one another, according to embodiments disclosed herein. The toroidal core 112 is not shown in these figures. As shown in FIG. 5C, which views the inverter apparatus 500 from the side, the circular positive DC busbar 102 is mounted on top of the circular negative DC busbar 104, and the circular negative DC busbar 104 is positioned on top of the switch modules 504A through 504F. FIG. 5D shows that each switch module 504 contains two switches (an upper switch 506A and a lower switch 506B) connected in series. Therefore, in the example shown, the inverter has a total of twelve (12) switches to form a 6-phase inverter. The AC busbars 110A through 110F extend from the switch modules 504A through 504F, respectively. The positive DC busbar 102 defines a top layer whereas the negative DC busbar 104 defines a bottom layer in the dual-layer DC busbar configuration. There is no base plate in this example because the dual-layer DC busbar configuration requires no additional support.

The DC busbars 102 and 104 can be attached to each other via adhesive or any other suitable means of attachment. Also, each of the DC busbars 102 and 104 is at least partially coated with an insulating coating material. The circular negative DC busbar 104 has a plurality of openings or holes 508 through which the circular positive DC busbar 102 (not shown in FIG. 5D) can be electrically coupled with the upper switches 506A in the switch modules 504A through 504F. The circular negative DC busbar 104 is electrically coupled with the lower switches 506B in the switch modules 504A through 504F. In some examples, the size of the DC busbars 102 and 104 are similar or substantially the same, whereas in some examples, the thickness of one of the DC busbars 102 and 104 may be wider or narrower than the other. The switch modules 504A through 504F are positioned radially symmetrically, for example with equal interval between two consecutive switch modules, along the DC busbars 102 and 104. Each switch module 504 is electrically coupled with both of the DC busbars 102 and 104 as well as a corresponding AC busbar 110 as shown in FIG. 5D.

It is to be understood that the positions of the positive and negative DC busbars can be switched, as suitable. Benefits of having such radially symmetrical DC busbars include the capability of symmetrically distributing current. Symmetrical current distribution causes symmetrical heating in the system, thereby reducing any "hotspots" that may occur due to the system operating for a prolonged period of time or due to some components failing faster than others. The toroidal core also assists in the reduction of the number of hotspots due to the more symmetrical heat generation achieved by the toroidal shape as compared to E-shaped or U-shaped cores. The heat that is generated asymmetrically with E-shaped or U-shaped cores may cause hotspots to form in various locations which may be difficult to identify. Symmetrical heat generation, therefore, benefits in reducing the overall number of hotspots, thereby also reducing the need to identify such hotspots.

Furthermore, the benefits of perpendicular configuration of the inverter system with respect to the electric machine to which it is coupled, include enabling a more vertical structure for the electric machine system. That is, with less of a horizontal landing pattern than would be necessary if the inverter system is placed next to the electric machine or parallel to the longitudinal axis of the electric machine, the electric machine system requires less space to install, which is beneficial when the horizontal space is limited in some machine packages. Eliminating the horizontal space that would be occupied by the inverter system by using the vertical free space allows for designs that conserve more space.

Furthermore, in some examples, at the DC side of the inverter, the DC busbars 102 and 104 may also be coupled with a DC filter such as a secondary filtering core (not shown) to allow DC and low-frequency currents to pass through while blocking harmful high-frequency currents, where the secondary filtering core is a separate component from the toroidal core 112. This allows a device to work correctly by diverting unnecessary noise, for example. The secondary filtering core may have any suitable shape and configuration. In some examples, the secondary filtering core is also radially symmetrical.

The present disclosure pertains to inverter and electric machine systems which may be implemented in various devices including but not limited to traction motors and stationary energy storage unit. In traction motors, the common-mode current can flow to the motor bearing and shaft through capacitive coupling and reduce the lifetime of motor components. In stationary energy storage unit, the common-mode current can flow through the neutral line into the DC-link capacitor. In both cases, it is desired to reduce the common-mode current.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. An apparatus comprising:
   a DC energy source;
   a planar and radially symmetrical positive DC busbar coupled with a positive terminal of the DC energy source;
   a planar and radially symmetrical negative DC busbar coupled with a negative terminal of the DC energy source;
   an inverter comprising a plurality of switches, the plurality of switches being positioned radially symmetrically with respect to a center of the DC busbars, and each switch being coupled with the positive DC busbar or the negative DC busbar on a first end and one of a plurality of AC busbars on a second end; and
   a single toroidal filtering core located at the center of the DC busbars and configured to couple with the plurality of AC busbars.

2. The apparatus of claim 1, wherein surfaces of the positive DC busbar and the negative DC busbar are coated with an insulating coating material.

3. The apparatus of claim 2, wherein one of the DC busbars is mounted on the other of the DC busbars.

4. The apparatus of claim 3, wherein the one of the DC busbars is electrically coupled with the plurality of switches through a plurality of openings formed in the other DC busbar.

5. The apparatus of claim 1, further comprising a planar base on which the DC busbars are installed.

6. The apparatus of claim 1, further comprising a load coupled with the inverter such that a longitudinal axis of the load is substantially perpendicular to a plane defined by at least one of the DC busbars.

7. The apparatus of claim 6, wherein the load comprises a stator and the inverter is installed on a periphery of the stator.

8. The apparatus of claim 1, wherein each of the DC busbars comprises a circular configuration.

9. The apparatus of claim 1, further comprising a printed circuit board positioned concentrically with respect to the DC busbars.

10. The apparatus of claim 1, wherein each of the DC busbars comprises a regular hexagonal configuration.

11. The apparatus of claim 1, wherein each pair of the plurality of switches is contained in one of a plurality of switch modules, and the switch modules are positioned radially symmetrically along the positive DC busbar and the negative DC busbar such that each of the switch modules is electrically coupled with the positive DC busbar, the negative DC busbar, and one of the plurality of AC busbars.

12. The apparatus of claim 1, further comprising a secondary filtering core coupled with the DC busbars.

13. A system comprising:
a DC energy source;
a planar and radially symmetrical positive DC busbar coupled with a positive terminal of the DC energy source;
a planar and radially symmetrical negative DC busbar coupled with a negative terminal of the DC energy source;
an inverter comprising a plurality of switches, the plurality of switches being positioned radially symmetrically with respect to a center of the DC busbars, and each switch being coupled with the positive DC busbar or the negative DC busbar on a first end and one of a plurality of AC busbars on a second end;
a single toroidal filtering core located at the center of the DC busbars and configured to couple with the plurality of AC busbars; and
an electric machine configured to be electrically coupled with the plurality of AC busbars such that a longitudinal axis of the electric machine is substantially perpendicular to a plane defined by at least one of the DC busbars.

14. The system of claim 13, wherein surfaces of the positive DC busbar and the negative DC busbar are coated with an insulating coating material.

15. The system of claim 14, wherein one of the DC busbars is mounted on the other of the DC busbars.

16. The system of claim 15, wherein the one of the DC busbars is electrically coupled with the plurality of switches through a plurality of openings formed in the other DC busbar.

17. The system of claim 13, wherein each of the DC busbars comprises a circular configuration.

18. The system of claim 13, wherein each pair of the plurality of switches is contained in one of a plurality of switch modules, and the switch modules are positioned radially symmetrically along the positive DC busbar and the negative DC busbar such that each of the switch modules is electrically coupled with the positive DC busbar, the negative DC busbar, and one of the plurality of AC busbars.

* * * * *